United States Patent
Kanai et al.

(10) Patent No.: US 9,017,847 B2
(45) Date of Patent: Apr. 28, 2015

(54) ELECTRIC DEVICE ASSEMBLY AND FILM-COVERED ELECTRIC DEVICE STRUCTURE

(75) Inventors: Takeshi Kanai, Kanagawa (JP); Tadashi Shimamori, Kanagawa (JP)

(73) Assignees: NEC Corporation, Tokyo (JP); Fuji Jukogyo Kabushiki Kaisha, Tokyo (JP)

(*) Notice: Subject to any disclaimer, the term of this patent is extended or adjusted under 35 U.S.C. 154(b) by 1509 days.

(21) Appl. No.: 11/917,744

(22) PCT Filed: Jun. 15, 2006

(86) PCT No.: PCT/JP2006/312037
§ 371 (c)(1),
(2), (4) Date: Dec. 14, 2007

(87) PCT Pub. No.: WO2006/135008
PCT Pub. Date: Dec. 21, 2006

(65) Prior Publication Data
US 2009/0208828 A1 Aug. 20, 2009

(30) Foreign Application Priority Data

Jun. 17, 2005 (JP) ................................ 2005-177812
Sep. 13, 2005 (JP) ................................ 2005-265174

(51) Int. Cl.
*H01M 10/50* (2006.01)
*H01M 2/10* (2006.01)
(Continued)

(52) U.S. Cl.
CPC .............. *H01M 2/1077* (2013.01); *H01G 9/12* (2013.01); *H01G 9/14* (2013.01); *H01G 9/155* (2013.01); *H01M 2/1061* (2013.01);
(Continued)

(58) Field of Classification Search
USPC ........................................................ 429/120
See application file for complete search history.

(56) References Cited

U.S. PATENT DOCUMENTS 4,292,381 A * 9/1981 Klein ............................ 429/120
6,335,116 B1 * 1/2002 Yamane et al. ............... 429/120
(Continued)

FOREIGN PATENT DOCUMENTS

JP 11-016546 A 1/1999
JP 2004-014125 A 1/2004
(Continued)

OTHER PUBLICATIONS

Japanese Office Action issued for corresponding JP Application No. 2011-266109, dated Jun. 13, 2013 (with English translation of the Examiners comments).

*Primary Examiner* — Ula C. Ruddock
*Assistant Examiner* — Archer Dudley
(74) *Attorney, Agent, or Firm* — Arent Fox LLP (57) ABSTRACT

Assembled battery (80) includes two battery cells (20A, 20B) arranged in parallel, which are accommodated in single parallel-arranged module (50). Inter-battery airflow passage (65) is formed between parallel-arranged modules so as to allow cooling air to pass therethrough. Pressure contact members (60) each have hollow portion (61) formed by solid portion (66) and thin wall portion (61a) and are arranged in layers. Hollow portion (61) forms a cooling air passage. Cooling air supplied to the cooling air passage is sent to battery cell (20B) on the rear side, and directed and supplied toward the central part of battery cell (20B). Solid portions (66) in area A hold electrode tab (25) therebetween while pressure contact members (60) are in contact with each other in area B.

18 Claims, 9 Drawing Sheets

(51) Int. Cl.
*H01G 9/12* (2006.01)
*H01G 9/14* (2006.01)
*H01G 9/00* (2006.01)
*H01M 2/20* (2006.01)
*H01M 10/613* (2014.01)
*H01M 10/617* (2014.01)
*H01M 10/647* (2014.01)
*H01M 10/6563* (2014.01)
*H01M 10/6566* (2014.01)
*H01M 10/6556* (2014.01)
*H01M 10/6567* (2014.01)

(52) U.S. Cl.
CPC ......... *H01M 2/202* (2013.01); *H01M 10/5004* (2013.01); *H01M 10/5008* (2013.01); *H01M 10/5032* (2013.01); *H01M 10/5067* (2013.01); *H01M 10/5073* (2013.01); *H01M 10/5057* (2013.01); *H01M 10/5075* (2013.01); *Y02E 60/13* (2013.01); *Y02T 10/7022* (2013.01)

(56) References Cited

U.S. PATENT DOCUMENTS

| | | | |
|---|---|---|---|
| 7,597,992 B2 * | 10/2009 | Kanai et al. | 429/53 |
| 7,700,227 B2 | 4/2010 | Kaneta | |
| 2003/0211384 A1 * | 11/2003 | Hamada et al. | 429/120 |
| 2004/0036444 A1 * | 2/2004 | Oogami | 320/110 |
| 2005/0153199 A1 * | 7/2005 | Yagi et al. | 429/148 |
| 2005/0208375 A1 * | 9/2005 | Sakurai | 429/162 |

FOREIGN PATENT DOCUMENTS

| | | | | |
|---|---|---|---|---|
| JP | 2004-103258 | | 4/2004 | |
| JP | 2004103258 | * | 4/2004 | H01M 2/10 |
| JP | 2004-288527 | | 10/2004 | |
| JP | 2004-306726 | | 11/2004 | |
| JP | 2005-116430 A | | 4/2005 | |
| JP | 2005-116457 A | | 4/2005 | |
| JP | 2005-122927 A | | 4/2005 | |
| JP | 2005-268004 | | 9/2005 | |
| JP | 2005-294023 | | 10/2005 | |
| JP | 2006-185894 | | 7/2006 | |
| WO | WO2005096412 | * | 10/2005 | H01M 2/12 |

* cited by examiner

ELECTRIC DEVICE ASSEMBLY AND FILM-COVERED ELECTRIC DEVICE STRUCTURE

TECHNICAL FIELD

The present invention relates to an electric device assembly made up of a plurality of film-covered electric devices (e.g. film-covered batteries).

BACKGROUND TECHNOLOGY

In recent years, as an electric power source for driving electric vehicles etc., use of an assembled battery made of a plurality of lithium ion secondary cells that are covered by film for instance have been made. It has been known that, with such an assembled battery, in order to maximize the charging and discharging performance of the battery (or in order to avoid reduction of battery life), each of the film-covered cells need to be cooled.

Figure 1:
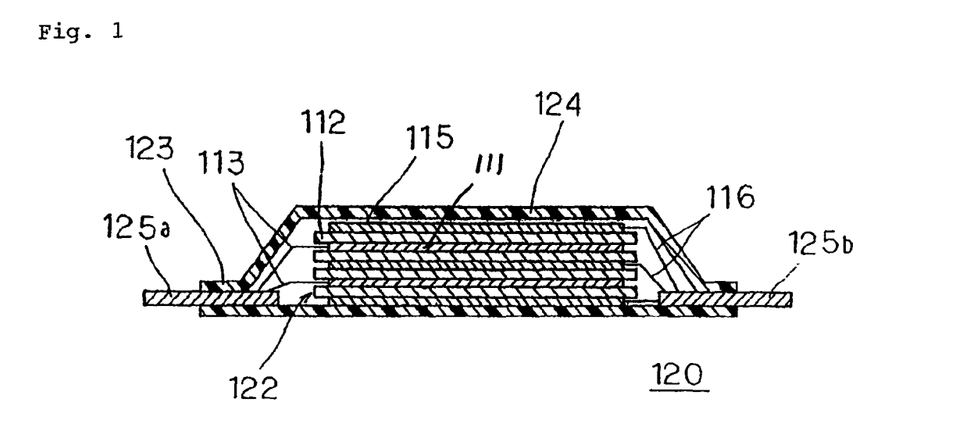
FIG. 1 is a sectional view showing a conventional typical battery cell configuration.

FIG. 1 shows a configuration of a conventional typical battery cell (film-covered battery). Battery cell 120 includes battery element 122 arranged inside a closed space formed by packaging film 124. Battery element 122 is comprised of alternately layered positive and negative electrode plates 111 and 115 separated by separators 112 and an electrolyte filling the closed space. Electrode tabs 125a and 125b are extracted from sealed portions 123 between packaging films. Electrode tab 125a for the positive electrode is connected to each positive electrode plate 111 via collector 113. Electrode tab 125b for the negative electrode is connected to each negative electrode plate 115 via collector 116.

In some cases, with thus configured battery cell 120, the electrode tabs may be heated to high temperatures (for example, 60 to 90 deg. C.) during usage of the battery. For this reason, there has been a risk that electrolyte will leaks out from sealed portions 123 between the films. Japanese Patent Application Laid-open 2004-103258 proposed an assembled battery configuration shown in FIG. 2 to solve this problem.

Figure 2:
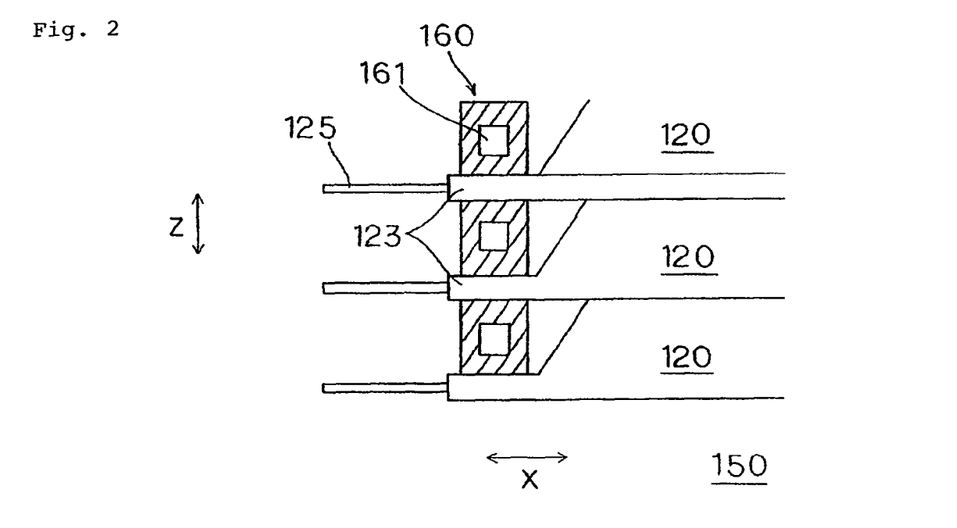
FIG. 2 is a view showing one example of a conventional assembled battery with pressure contact members disposed in the film sealed portions.

In assembled battery 150, pressure contact members 160 having elasticity are disposed between sealed portions 123 of individual battery cells 120 arranged in layers so that sealed portions 123 can be pressed by pressure contact members 160. Accordingly, even if electrode tabs 125 become high, It will be difficult for electrolyte to leak from the sealed portions. Further, pressure contact member 160 is formed with hollow 161 therein, and a cooling agent is circulated inside this hollow so as to be able cool sealed portions 123.

In this way, the countermeasure against heat in order to make the assembled battery function is a significant topic.

On the other hand, when the assembled battery is mounted on an electric vehicle, it is also very important to take preventive measures against vibration in addition to measures against heat. In particular, since the electrode tab is made of a thin metal plate, it is prone to fatigue failure if periodic vibration occurs.

Since pressure contact member 160 shown in FIG. 2 also has elasticity in addition to a cooling function, since pressure contact member 160 also has elasticity, this serves as an anti-vibration function.

Other than the above, as a countermeasure against vibration there are cases in which a module formed of a plurality of connected film-covered batteries is accommodated in a module case with anti-vibration rubber.

DISCLOSURE OF INVENTION

Figure 3:
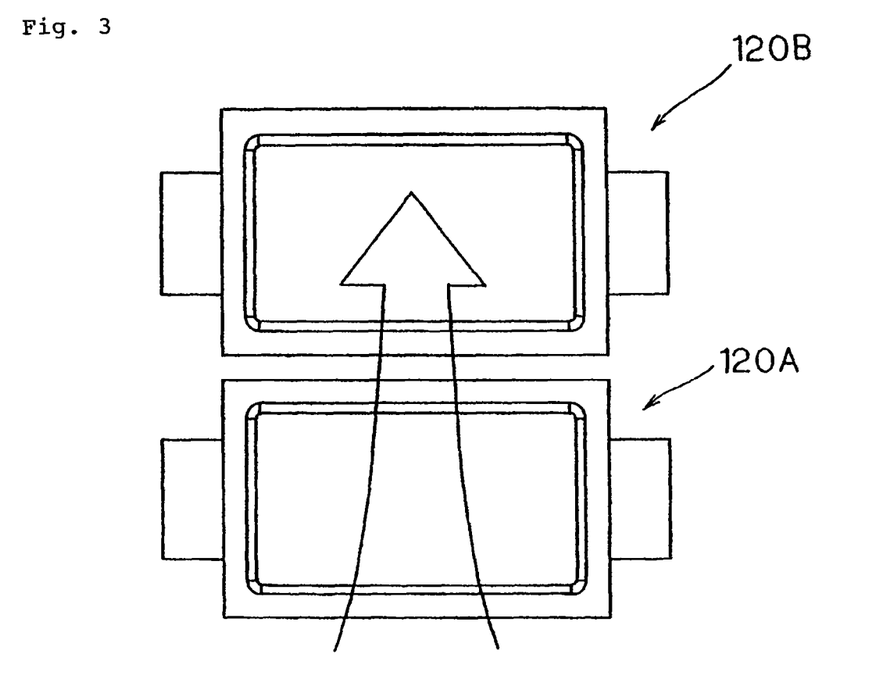
FIG. 3 is a top view for illustrating the cooling of two battery cells arranged in parallel.

In configuring an assembled battery, there is also an arrangement in which battery cells 120A and 120B are two-dimensionally provided as shown in FIG. 3. In this configuration, however it is impossible to uniformly cool the two battery cells even if air is blown from the side of one battery cell (at bottom the side in the drawing) to the other side of the battery cell (at the top side in the drawing) as illustrated with an arrow, for example. This is because cooling air is warmed as it passes through first battery cell 120A so that this warmed air is supplied to second battery cell 120B, thus producing a difference in cooling between the two battery cells.

Japanese Patent Application Laid-open 2004-103258 disclosed a configuration of cooling sealed portion 123 between packaging films but made no reference to cooling the central part of the battery cell. On the other hand, in the arrangement shown in FIG. 3, it is also possible to adjust the shape of a duct (not shown) for supplying cooling air so as to bring cooling air uniformly to the two battery cells. However, provision of such a duct will enlarge the assembled battery.

On the other hand, as to the countermeasure against vibration, in cases where the assembled battery is to be mounted on a vehicle, it is necessary to consider measures against the force of a strong impact, such as collision with other vehicles, in addition to vibrations that occur during the ordinary operation.

When a shock absorbing mechanism that is mainly aimed at absorbing strong impacts is constructed with elastic material such as rubber and the like, it is necessary to use material having high hardness. However, it is difficult for an elastic material with high hardness to absorb relatively weak vibrations etc, hence a separate mechanism for absorbing relatively weak force is needed.

Further, in a configuration in which vibrations and impacts are absorbed by a module case equipped with a shock absorbing mechanism, the module needs to be fixed firmly inside the module case. This is because if the module is not securely fastened, there is a risk of the module colliding with the module case and resultantly being damaged. However, this configuration not only requires parts for securely fastening the module inside the case, but additional problems are entitled such as weight increase and the time and effort required to fasten the module.

Also, in the configuration of the module case having a shock absorbing mechanism, vibrations and impacts are adapted to be absorbed by the entire module. This configuration can use a relative simple shock absorbing structure but if a local force acts on the module, the force cannot be absorbed locally and will spread throughout the entire module. For example, if part of the module case is deformed due to a vehicle accident and the module case collides with the module, the force will spread to the entire module and break the module as a whole. To deal with this, this configuration needs a module case, that has strong rigidity resulting in increase in the weight of the module case.

In a case where a film-covered battery is individually accommodated in a battery case, this configuration does not demand high rigidity for the module case and can handle local impacts since the battery case can protect the battery. However, even when a battery is accommodated in the battery case, in order to construct an assembled battery it is necessary to draw out the electrode tabs of the film-covered battery from the battery case and connect them to the adjacent batteries. If repeated vibrations and impacts are applied to the electrode tab, bending stress will occur at the part near the base of the electrode tab, or at the location where the electrode tab and the battery element are connected, hence the electrode tab will be broken. In order to prevent the electrode tab from being broken, a shock absorbing member is arranged at the opening portion where the electrode tab is extracted from the battery case. However, this shock absorbing member has to be formed relatively thin because of the dimensions of the battery case and battery itself, hence this makes it impossible to sufficiently absorb the vibrations and impacts. As a result, there remains a fear that the electrode tabs will become damaged when a strong impact, such as that due to collision of the vehicle and the like, is applied.

Though the above description was described taking examples of film-covered batteries, the above problem is not limited to batteries. For example, the same situation can occur with a device in which capacitors and the like are arranged as electric device elements in a film-package.

The present invention has been devised in view of the above problems, it is therefore an object of the present invention to provide an electric device assembly or the like made up of film-covered electric devices arranged in a row, which permits all the film-covered electric devices to be cooled uniformly and which still has an configuration advantageous in ensuring that the entire device is kept compact.

It is another object of the present invention to provide an electric device assembly or the like also that includes a shock absorbing mechanism.

In order to achieve the above object, the electric device assembly of the present invention is an electric device assembly in which two or more film-covered electric devices, each having an electric device element that reserves and outputs electric energy accommodated in a film package and an electrode tab extracted from a sealed portion of said film package, are arranged in a row, and the vicinity of said electrode tab in each of said film-covered electric devices is pressed by a pressure contact member, and said pressure contact member includes a cooling air passage for transferring cooling air fed from the side of one of said film-covered electric devices to the other one of said film-covered electric devices and for directing and supplying said cooling air in the area of the other film-covered electric device toward the central part of the film-covered electric device.

In the thus constructed electric device assembly, the cooling air that is fed into the cooling air passage of the pressure contact member, bypassing the film-covered electric device located on the front side with respect to the direction of the cooling airflow, is directly supplied to the film-covered electric device located further to the rear. Accordingly, it is possible to uniformly cool both the film-covered electric device on the front side and the film-covered electric device on the rear side. Here in the present invention this cooling air passage is formed in the pressure contact member. That is, the pressure contact member functions as a member for pressing the electrode tab vicinity and also functions as a member that forms the aforementioned cooling air passage. Accordingly, no special parts need to be added in order to form a cooling air passage. Here, "toward the central part" of the film-covered electric device does not mean the direction toward a point in the center of the device when it is viewed from top but should mean the direction toward the inner part of the device from the device periphery.

Specifically, the aforementioned cooling air passage may be formed of a hollow portion formed in the longitudinal direction of said pressure contact member and a plurality of outlets in communication with the hollow portion, each of said outlets may open toward said central part of said film-covered electric device. Further, said pressure contact member may have a pressing surface that applies pressure to the vicinity of said electrode tab. In this case, the pressing surface may press only said sealed portion. The pressing surface may press both said electrode tab and said sealed portion. Moreover, the pressing surface may press only said electrode tab.

The present invention may be also one in that two or more modules, each made up of two or more film-covered electric devices arranged in a row, are arranged in layers, and said pressure contact member is arranged between said film-covered electric device of one of said modules and said film-covered electric device of the other of said modules. Further, when arranged in layers as above, it is preferable that an airflow passage that passes by said central part of each of said film-covered electric devices be formed between said modules arranged adjacent to each other. It is also preferable that the entrance side of the airflow passage and the entrance side of the cooling air passage (hollow portion) of said pressure contact member be made open and oriented in the same direction. Further, when the aforementioned airflow passage is hermetically closed along both sides by said pressure contact members, circulation of the cooling air in the airflow passage can be stabilized.

The aforementioned pressure contact member may be an elastic member that applies repulsive force as a result of elastic deformation to the vicinity of said electrode tab via said pressing surface. Further, a channel for circulating a cooling agent may be provided separately from said cooling air passage.

Alternatively, the electric device assembly of the present invention is one in which a plurality of film-covered electric devices, each having an electric device element that reserves and outputs electric energy accommodated in a film package and an electrode tab extracted from a sealed portion of said film package, are arranged in layers, and said electrode tab in each of said film-covered electric devices is held between a plurality of pressure contact members formed of elastic material, each of said pressure contact members being extended beyond said sealed portion in the direction in which said electrode tab is extracted.

Since the pressure contact members for holding the electrode tab are extended beyond said sealed tab, an external force acting in the direction in which the electrode tab is extracted can be received by the pressure contact members before the external force acts on the body portion of the electric device. Since the pressure contact members are formed of elastic material, it is possible for them to function as shock absorbers.

Further, each of said pressure contact members may include a solid portion having a solid structure and a hollow portion having as an outer peripheral wall a thin wall integrally formed with said solid portion, and said solid portion may be extended beyond said sealed portion in the direction in which said electrode tab is extracted, and said thin wall of said hollow portion may abut said film-covered electric device. The solid portion is able to absorb relatively strong external force whereas the thin wall is able to absorb relatively weak external force. That is, the pressure contact member of the present invention can absorb weak to strong forces, by an integrated structure formed of solid and hollow portions.

Also, said solid portions of said pressure contact members may be layered so as to from a first area where said electrode tab is held therebetween and a second area where said pressure contact members are put in direct contact with each other.

When the pressure contact member is formed of rubber, use of the above layering method makes the pressure contact members behave as so-called laminated rubber in the first area and as block rubber in the second area. The first area is unlikely to deform in the direction of lamination, so the first area can receive a large load. Resultantly, when a plurality of electric device elements are accommodated in a case, it is possible to fix them fast even if a large load is acted. On the other hand, the first area is easy to deform in the direction perpendicular to the direction of lamination, or in the direction in which the electrode tabs are extracted, so the first area can flexibly absorb forces acting in this direction.

Further, since the second area is easy to deform both in the direction of lamination of the pressure contact members and in the direction in which the electrode tabs are extracted, it is possible to flexibly absorb forces that act in either direction.

It is also possible that the friction coefficient between said pressure contact members is greater than the friction coefficient between said pressure contact member and said electrode tab. That is, by making the first area slide more easily than the second area, it is possible to cause shear deformation in the pressure contact members at the boundary between the first area and the second area. As a result it is possible to flexibly absorb forces weaker than those that can be absorbed through compression deformation.

It is also preferable that said pressure contact members are not bonded to each other. Letting them be slidable from each other without fixing them by adhesives or the like, makes it possible to attenuate the amount of transfer of impact force to other parts if a local impact is applied, for instance, thus it is hence possible to minimize damage to the device as a whole.

Said pressure contact members may be different in weight from each other. This makes it possible to prevent occurrence of resonance at a certain predetermined frequency.

The present invention can also be applied to a single film-covered electric device. That is, the film-covered electric device structure of the present invention includes: a film-covered electric device having an electric device element that reserves and outputs electric energy accommodated in a film package and an electrode tab extracted from a sealed portion of said film package; and a pressure contact member that presses the vicinity of said electrode tab in the film-covered electric device, and said pressure contact member includes a cooling air passage for transferring cooling air along said sealed portion and for directing and supplying said cooling air in the area on the downstream side of the flow of said cooling air toward the central part of the film-covered electric device.

Use of the pressure contact member of the present invention makes it possible to uniformly cool all the film-covered electric devices arranged in a row. Further, use of the pressure contact member of the present invention enables protection of the film-covered electric device against vibrations and impact force.

BEST MODE FOR CARRYING OUT THE INVENTION

Figure 4:
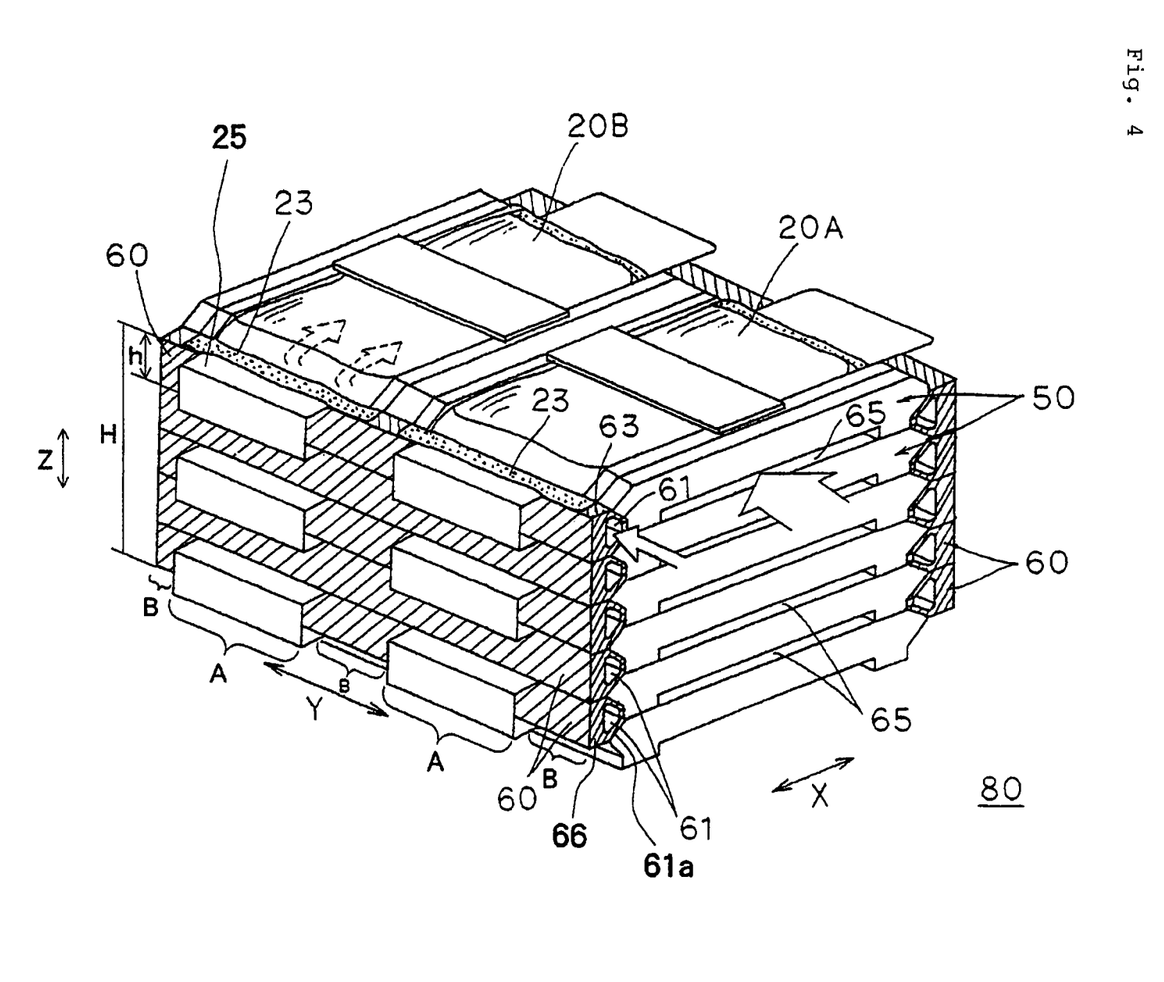
FIG. 4 is an external perspective view showing an assembled battery according to the exemplary embodiment of the present invention.
Figure 5:
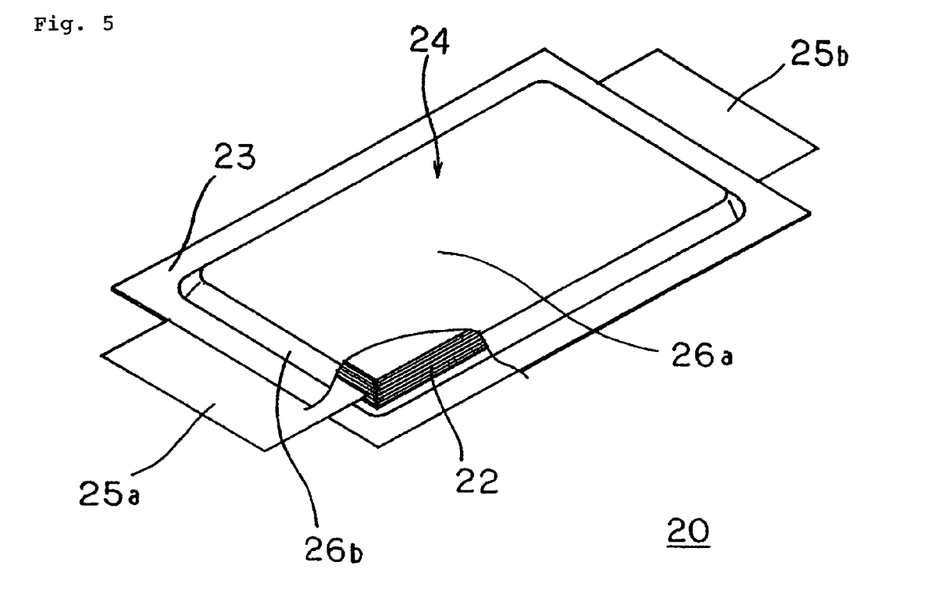
FIG. 5 is a perspective view showing a battery cell unit used in an assembled battery according to the exemplary embodiment of the present invention.

Referring next to the drawings, the exemplary embodiment of an electric device assembly of the present invention will be described taking an example of an assembled battery including a group of film-covered batteries. FIG. 4 is an external perspective view showing an assembled battery of the exemplary embodiment. FIG. 5 is a perspective view showing a battery cell unit used in an assembled battery of the exemplary embodiment.

As shown in FIG. 4, assembled battery 80 is comprised of six parallel-arranged modules 50 provided in layers, each having two battery cells 20A and 20B (also called "battery cells 20"). Pressure contact members 60 are laid out on both sides (with respect to the X-direction in the drawing) of parallel-arranged modules 50.

A conventional typical film-covered battery shown in FIG. 5 can be used as battery cell 20. Battery cell 20 is a lithium ion secondary battery, and accommodates battery element 22 with an electrolyte inside a closed space formed by two sheets of packaging film 24 forming a film package. The four sides on the outer periphery of packaging film 24 are formed with sealed portions 23 where film sheets are thermally sealed to each other. Electrode tabs 25a and 25b are extracted from two short sides of four sealed portions 23.

Each sheet of packaging film 24 is formed with a depressed portion (not shown with any symbol) having a shape corresponding to battery element 22. The depressed portion is defined by a flat central part 26a formed in the area covering the top surface (bottom surface) of battery element 22 and sloping surfaces 26b formed around it. It should be noted that when battery cell 20 is cooled, cooling this central part 26a produces the most effective result.

Figure 6:
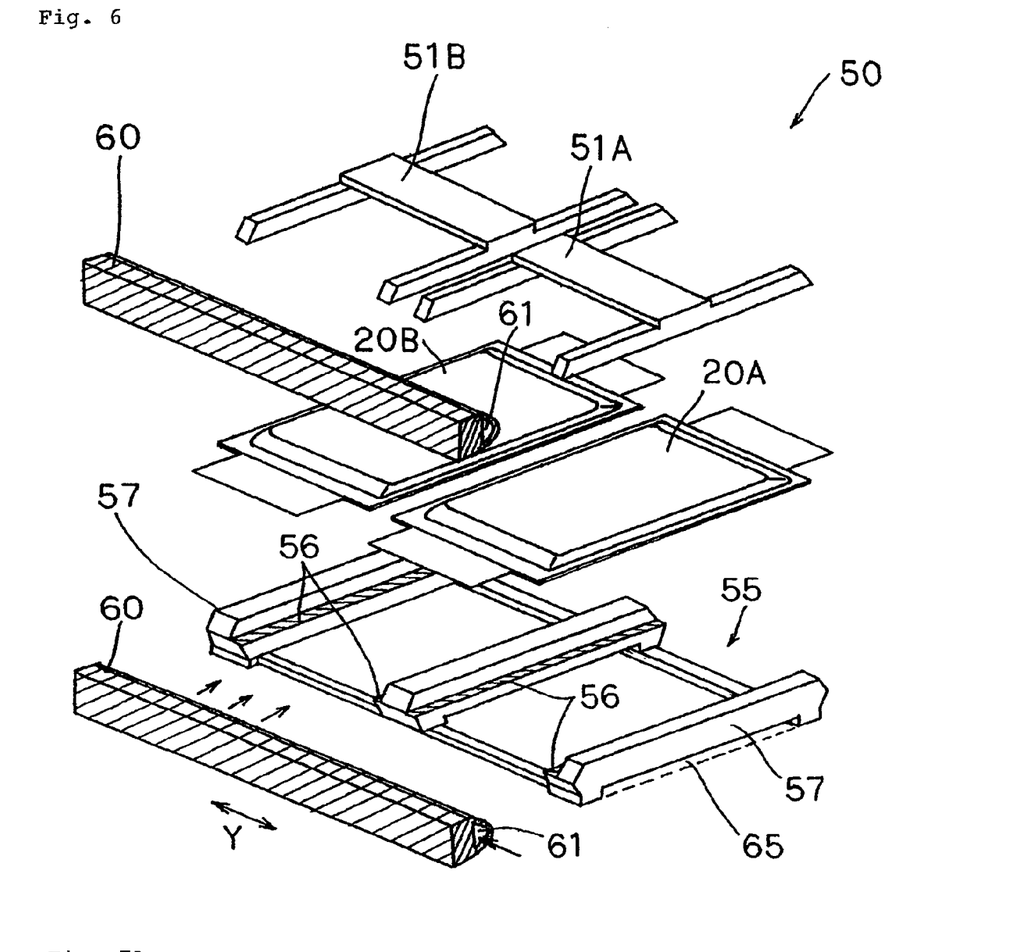
FIG. 6 is an exploded perspective view showing a configuration of parallel-arranged modules.

As shown in FIG. 6, in each parallel-arranged module 50, two battery cells 20A and 20B are placed side by side on single cell holder 55. Cell holder 55 has flat supporters 56 for supporting sealed portions 23 (long side edges) of each battery cell. Further, pressing members 51A and 51B are attached from above respective battery cells, whereby sealed portions 23 of the battery cells are held between holding portion 56 and part of the pressing member.

Both cell holder 55 and pressing members 51A and 51B may be formed of resin moldings. Further, though two battery cells are arranged in the exemplary embodiment, the configuration is not limited to this and three or more battery cells may be arranged.

Formed on the bottom side of side wall 57 of cell holder 55 is a cutout, which serves as an opening portion on the entrance side of inter-battery airflow passage 65. Though not illustrated, a similar cutout is formed on side wall 57 on the opposite side with respect to the Y-direction in the drawing, so that the cooling air supplied from the front side with respect to the Y-direction in the drawing passes through inter-battery airflow passage 65 to the rear side.

Cell holder 55 has flat supporters 56 for supporting sealed portions 23 (long side edges) of each battery cell. When pressing members 51A and 51B are fitted over respective battery cells from above, sealed portion 23 of the battery cell is held between holding portion 56 and part of the pressing member.

Next, the configuration of pressure contact member 60 and its functions (cooling function and shock absorbing function) will be described.

[Pressure Contact Member Configuration]

Pressure contact member 60 is formed of an elastic member such as, for example, urethane foam, rubber or the like, so that it presses the vicinity of electrode tab 25 of each battery cell 20A or 20B by repulsive force generated by elastic deformation, and also due to its elasticity it absorbs vibrations and impacts from without. For example, as shown in FIG. 4, pressure contact member 60 is extended directly in the Y-direction in the drawing, and its length is set to be greater than two battery cells. Since the length of pressure contact member 60 is longer than the width of electrode tab 25, when arranged in layers, pressure contact members 60 form area A where electrode tab 25 is held therebetween and form area B where pressure contact members come into contact with each other.

Figure 7A:
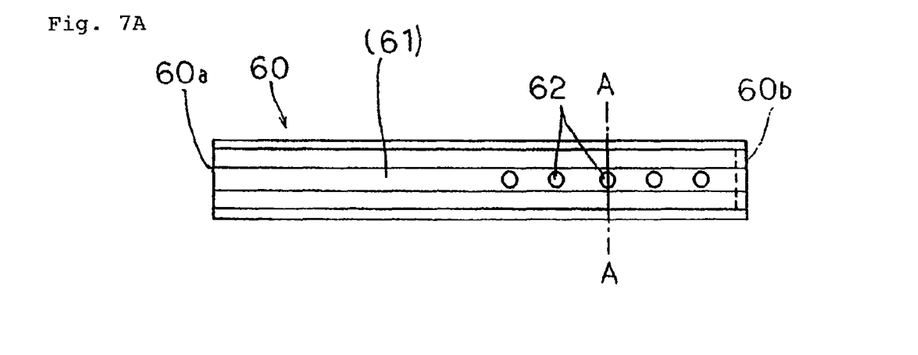
FIG. 7A is a front view showing a pressure contact member configuration.
Figure 7B:
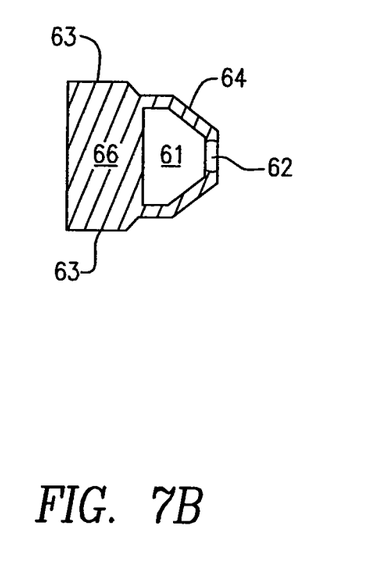
FIG. 7B is a sectional view cut along cutting line A-A showing a pressure contact member configuration.

Formed inside pressure contact member 60 is hollow portion 61 that extends lengthwise across almost the full length as shown in FIGS. 7A and 7B. In other words, pressure contact member 60 is a long tubular member with its hollow portion made open at one end 60a and closed at end 60b on the opposite side (the end located on the side of battery cell 20B in FIG. 4).

A plurality of outlets 62 are formed apart at intervals of a predetermined distance in the approximately half part on the end 60b side of pressure contact member 60. With this arrangement, cooling air supplied into hollow portion 61 can be blown out from outlets 62. In this exemplary embodiment, the area where outlets 62 are formed is specified to correspond to the length of the short side of the battery cell. Here in FIG. 7A, outlets 62 are illustrated as circular openings, but the outlets should not be limited to this, and may be given in a rectangular, elliptic or other shape.

Figure 8:
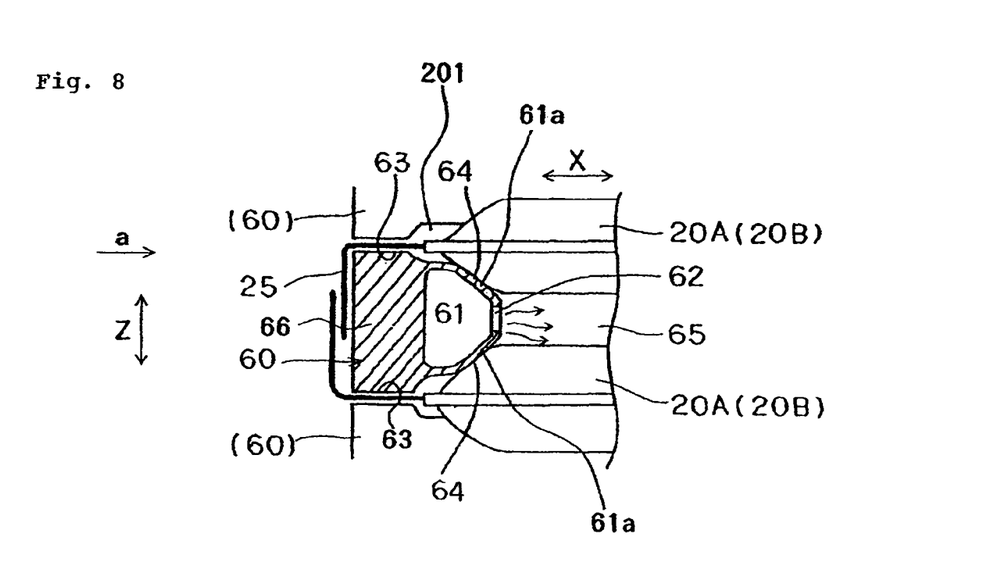
FIG. 8 is a sectional view showing a pressure contact member and its peripheral structure when an assembled battery is completed.

Pressure contact member 60 has solid portion 66 and hollow portion 61 when viewed in section as shown in FIGS. 7B and 8. Solid portion 66 has top and bottom surfaces forming flat pressing surfaces 63 while hollow portion 61 is formed by an easily deformable thin wall 61a.

[Cooling Function of the Pressure Contact Member]

Pressure contact members 60 are arranged one by one, as shown in FIG. 4, in such a manner that each member 60 is arranged between adjacent modules 50 with its hollow portion 61 directed in the same direction in which inter-battery airflow passage 65 opens. This arrangement has the advantage of providing simplicity in forming the duct (not shown) for supplying cooling air to each airflow passage 65 and to air hollow portion 61. However, in fact, it is also possible to provide a duct for supplying cooling air to each airflow passage 65 and a duct for supplying cooling air to each hollow portion 61, separately.

The cooling air supplied into each inter-battery airflow passage 65 flows through airflow passage 65 while being in contact with battery cells 20A and 20B, so that heat is exchanged between the cooling air and the battery cells, whereby the battery cells (four battery cells in this exemplary embodiment) that face airflow passage 65 are cooled.

The cooling air supplied into hollow portion 61 is sent to the side of battery cell 20B side without contact with central part 26a (see FIG. 5) of battery cell 20A and is blown out through outlets 62 toward the central part of battery cell 20B. In other words, the cooling air is adapted to be supplied directly to battery cell 20B on the rear side, bypassing battery cell 20A on the front side.

Though the cooling air that has passed through battery cell 20A is also supplied through airflow passage 65 to battery cell 20B on the rear side, this is not much of a problem even if this cooling air has been heated by battery cell 20A and hence has reached a high in temperature. This is because, that according to the arrangement of the exemplary embodiment, cooling air can be directly supplied to battery cell 20B on the rear side, thus making it possible to cool the battery cell on the rear side in an efficient manner.

As shown in FIG. 8, abutment surfaces 64 of thin wall 61a are adapted to come into hermetic contact with respective sloping surfaces of battery cells, so that pressure contact members 60 will hermetically close both sides (with respect to the X-direction in the drawing) of inter-battery airflow passage 65. Hermetic closure of inter-battery airflow passage 65 stabilizes the flow of cooling air inside the passage and also prevents reduction in cooling efficiency due to leakage of the cooling air.

Further, in the exemplary embodiment, since the bypass cooling air passage as described above is constructed by using hollow portion 61 and outlets 62 formed in pressure contact member 60, it is not necessary to add a special member (duct, etc.) in order to form the cooling air passage. Accordingly, this configuration is advantageous in downsizing the assembled battery.

When pressure contact members 60 are arranged so that their pressing surfaces 63 abut sealed portions 23 of battery cells 20A and 20B as shown in FIG. 4, the same effect as that of the configuration of Japanese Patent Application Laid-open 2004-103258 (see FIG. 2) can be obtained. That is, since the pressing force from pressure contact member 60 acts on sealed portion 23 in its thickness direction, leakage of liquid from sealed portion 23 becomes unlikely to occur even if the temperature of electrode tab 25 becomes high.

In fact, however, the present invention should not be limited to the configuration in which pressure contact member 60 is arranged to press only sealed portion 23. For example, each pressing surface 63 may be arranged so as to press electrode tab 25 only as shown in FIG. 8. Alternatively, it is also possible to provide a configuration in which each pressing surface 63 presses both electrode tab 25 and the sealed portion.

Figure 9:
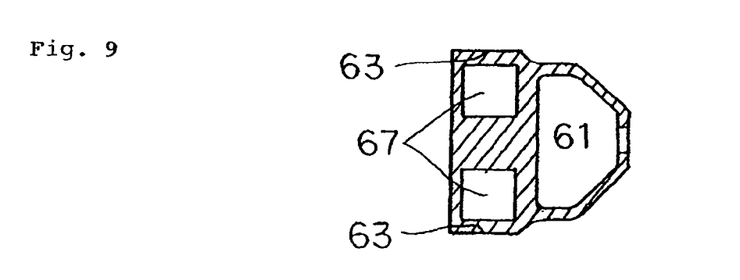
FIG. 9 is a sectional view showing another configurational example of a pressure contact member.

Here, the present invention should not be limited to above-described configurations. For example, as shown in FIG. 9, it is also possible to form channels 67 near respective pressing surfaces 63 independently from hollow portion 61 so that a coolant (including a cooling liquid) can circulate therethrough. Alternatively, in a case where three or more battery cells are laid out in each parallel-arranged module, it is preferable that the size and number of outlets 62 formed in the pressure contact member are modified as appropriate so as to make uniform the supplied amount of cooling air to each battery cell.

Further, though the above exemplary embodiment was described with reference to the configuration where two battery cells are arranged side by side, the present invention can be applied to a configuration where a battery cell is arranged singularly. That is, for a single, relatively large battery cell in which cooling would become uneven between the upstream and downstream sides of the cooling air, use of the above pressure contact members 60 makes it possible to suppress the lack of uniformity in cooling between the upstream and downstream sides.

[Shock Absorbing Function of the Pressure Contact Member]

The cell case of the exemplary embodiment is constructed so that only the long-sided sealed portions where no electrode tab 25 is extracted are held by and between cell holder 55 and pressing member 51 instead of all the four sealed portions at the periphery of the battery element of battery cell 20 being cut off. That is, the cell case of the exemplary embodiment does not have a configuration that totally encloses battery cells 20 with electrode tabs 25 pulled out through openings formed in the case. Electrode tab 25 is held between pressing surfaces 63 of pressure contact members 60 as shown in FIG. 8.

In the case where electrode tab 25 is gripped between pressure contact members 60, as in the configuration of FIG. 8, even if, for example the battery cell body vibrates and hence the electrode tab receives repeated stress, electrode tab 25 becomes unlikely to undergo breakage or other damage owing to the vibration attenuation effect by pressure contact members 60.

In the configuration in which only sealed portion 23 is gripped between pressure contact members 60 (see FIG. 4), if the electrode tab is formed of a member that is unlikely to be deformed, there is also a possibility that stress will concentrate on the part near the root of electrode tab 25 (the part that is extracted from the sealed portion). This may cause the electrode tab to break at the part near the root or may degrade the reliability of the sealed portion. Accordingly, in order to deal with this problem, it is preferable that the electrode tab be pressed by the pressure contact members as shown in FIG. 8.

As described above, pressure contact members 60 arranged in layers form area A where they hold electrode tab 25 therebetween and areas B where they come into contact with each other. That is, areas B where pressure contact members 60 come into contact with each other are formed at both sides of area A where electrode tab 25 is gripped. It should be noted that the pressure contact members are merely put in contact in area A and areas B without being firmly fixed by adhesives or the like, so that they can slide from each other if an external force exceeding a certain level is applied to area A and area B.

Hereinbelow, the characteristics of area A, area B, areas A and B, the boundary between areas A and B and thin wall 61a will be described using FIGS. 4, 10 to 12, respectively. In order to make the effect of the present invention more distinct, the pressing force acting on area A of pressure contact members 60 in the Z-direction may be made weaker than the pressing force acting on area B.

[Area A]

Area A of layered pressure contact members 60 is constrained from deforming by being partitioned by electrode tab 25. That is, this part forms a laminated rubber structure in which elastic elements having thickness h are layered (see FIG. 4).

Accordingly, the area A is able to tightly hold the modules as a whole because it is hard to become deformed if a force in the Z-direction is applied. In contrast, it is possible to flexibly absorb vibrations in the X- and Y-directions because the area is easy to become deformed if a shear force in X- and Y-directions is acted.

[Area B]

Area B of layered pressure contact members 60 in the exemplary embodiment has a thickness H=h×5 because five pressure contact members 60 are arranged in layers (FIG. 4). Since no electrode tab is disposed between the pressure contact members in area B, the laminated five pressure contact members 60 function as a single elastic member (rubber block) having a thickness of 5 h against to a force in the Z-direction.

As a result, if forces having the same strength act on area A and area B in the Z-direction, area B is compressed greater than area A so as to absorb vibrations in the Z-direction better than area A whereas the area is easy to become deformed when a force in the X- and Y-directions is applied, hence area B can flexibly absorb vibrations in these directions in the same manner as area A.

The case in which the pressure contact members having elasticity are interposed between individual cells arranged in layers as shown in FIG. 2 only presents the characteristics of laminated rubber. In contrast to this, in the present invention, area A presents the characteristics of laminated rubber while area B presents the characteristics of block rubber. As a result, it is possible to increase design flexibility.

[Area A and area B]

Figure 10A:
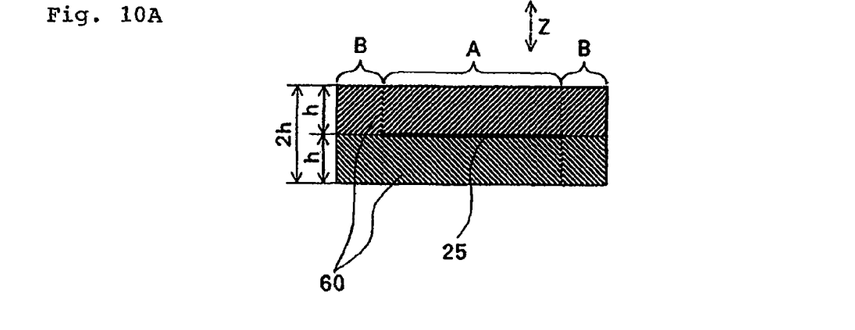
FIG. 10A is a schematic view showing one example of the holding structure of a battery cell using pressure contact members.
Figure 10B:
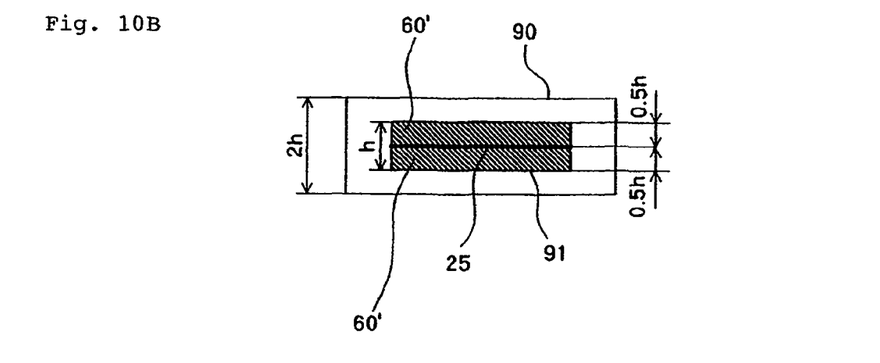
FIG. 10B is a schematic view showing another example of the holding structure of a battery cell using a pressure contact member.

FIGS. 10A and 10B show holding structures of battery cells using pressure contact members by comparison. Here, FIGS. 10A and 10B show different states in which one battery cell is supported, both holding structures being viewed in the direction of arrow a in FIG. 8 or in the direction in which the electrode tab is extracted from the battery element. FIG. 10A shows a holding structure in which two pressure contact members 60 of the exemplary embodiment are layered. FIG. 10B shows an example of a holding structure in which the battery cell is accommodated in cell case 90 where electrode tab 25 is extracted from opening portion 91 and pressure contact members 60' are where disposed in opening portion 91. Both the holding structures are 2 h high. The open height of opening portion 91 in FIG. 10B is h.

In the case of the exemplary embodiment shown in FIG. 10A, since pressing member 51 and cell holder 55 shown in FIG. 6 are used, the thickness will not be restrained by these members, hence the thickness of pressure contact member 60 for each member can be set to be h. On the contrary, in the case of FIG. 10B, the size of pressure contact member 60' is limited by the dimensions of opening portion 91 and cell case 90, hence the thickness of each member cannot be set to be h but can be only set to be equal to or smaller than h, or 0.5 h for example.

In the above way, the holding structure of the exemplary embodiment can secure a large enough thickness for pressure contact member 60, hence it is possible to improve sealing performance. Electrode tabs 25 are just held between two pressure contact members 60 without any sealing agent applied. Accordingly, there may occur a problem that cooling air leaks out from the interfaces. However, in the case of the exemplary embodiment, pressure contact member 60 can be made thick enough, so that it is possible to eliminate the gap between pressure contact member 60 and electrode tab 25 by applying a large pressing force in the vertical direction (Z-direction). In addition, since pressure contact member 60 is not accommodated in a case, it can present high deformability with its deformation unlimited by such a case. As a result, pressure contact member 60 can follow the displacement of electrode tab 25 in the Z-direction so effectively that a gap is unlikely to form even if electrode tab 25 deforms. Here, since thin wall 61a is made to press against the battery cell as shown in FIG. 8, leakage of cooling air can be prevented by this part. However, provision for such a double protection is preferred when the aging degradation of pressure contact member 60 is considered.

Further, electrode tab 25 is not fixed to pressure contact members 60 with a sealing agent or adhesive, but is just held between pressure contact members 60 in such a condition as to slide along pressing surfaces 63. Accordingly, if electrode tab 25 deforms in the Z-direction, electrode tab 25 will slide along pressing surfaces 63 so pressure contact member 60 can secure sealing without overstraining electrode tab 25.

[Boundaries between Area A and Area B]

Figure 11A:
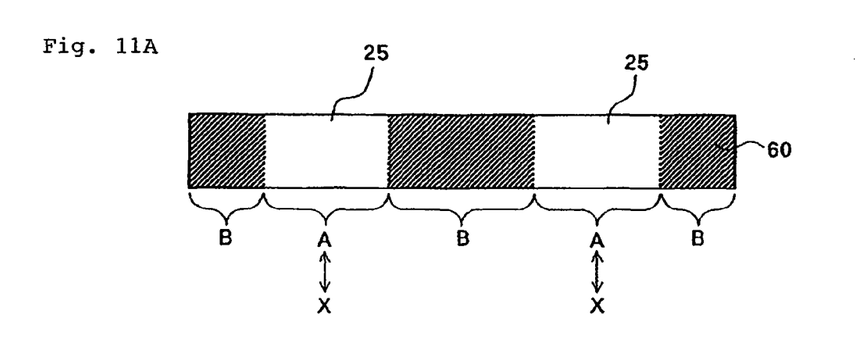
FIG. 11A is a schematic view for illustrating shear deformation in a pressure contact member of the present invention when the pressure contact member is viewed from the Z-direction, showing a state before a force in the X-direction is applied.
Figure 11B:
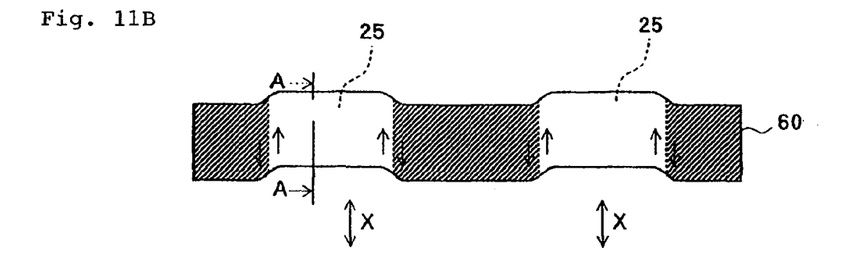
FIG. 11B is a schematic view for illustrating shear deformation in a pressure contact member of the present invention when the pressure contact member is viewed from the Z-direction, showing a state when a force in the X-direction is being applied.

FIGS. 11A and 11B are schematic views of pressure contact member 60 of the exemplary embodiment, viewed in the Z-direction. FIG. 11A shows a state of pressure contact member 60 before a force is applied in the X-direction and FIG. 11B shows a deformed state of pressure contact member 60 while a force in the X-direction is being applied. Here, in FIGS. 11A and 11B, only solid portion 66 of pressure contact member 60 is illustrated with hollow portion 60 omitted.

In the case of the layered structure of the exemplary embodiment, when comparing the friction coefficient in area A where pressure contact members 60 are in contact with electrode tabs 25 and the friction coefficient in area B where pressure contact members 60 are directly in contact with each other, the former is smaller. In area A pressure contact members 60 can easily to slide over the surfaces of electrode tabs 25 while in area B it is difficult for them to slide. That is, the exemplary embodiment is not one in which pressure contact members 60 are simply stacked but is one in which they are layered so that they are easy to slide in area A and are difficult to slide in area B. Here, area A may also hold the sealed portion in addition to electrode tab 25. This is because if area A is adapted to hold the sealed portion, the easy-to-slide performance will not change when compared to area B.

Incidentally, the relationship between the spring constant of rubber and its stroke differs between the case where pressure is applied in the direction of compression and the case where pressure is applied in the direction in which shear deformation is produced. The relationship between spring constant $k_c$ in compression and spring constant $k_s$ in shear is generally given as $$k_s = k_c / 5\alpha$$

where α is a shape factor. The amount of expansion and contraction of a rubber member when a shear force is applied to the rubber member is greater than the amount of expansion and contraction when a compression force is applied. That is, it is preferable to use a low hardness rubber when attempting to absorb a weak external force through compression. However, it is impossible for low-hardness rubbers to absorb strong external forces sufficiently. Accordingly, if forces ranging from a relatively weak force such as a small vibration to a strong force such as an impact force need to be absorbed through compression force only, it is necessary to prepare rubbers having corresponding harnesses. However, in the case of the exemplary embodiment, since pressure contact members 60 not only deform by compression but also deform by shear at the boundary between area A and area B, a relatively small force such as small vibration in the X-direction transfers to battery cell 20, hence it is not necessary to separately prepare low-hardness rubber.

[Thin Wall]

Figure 12:
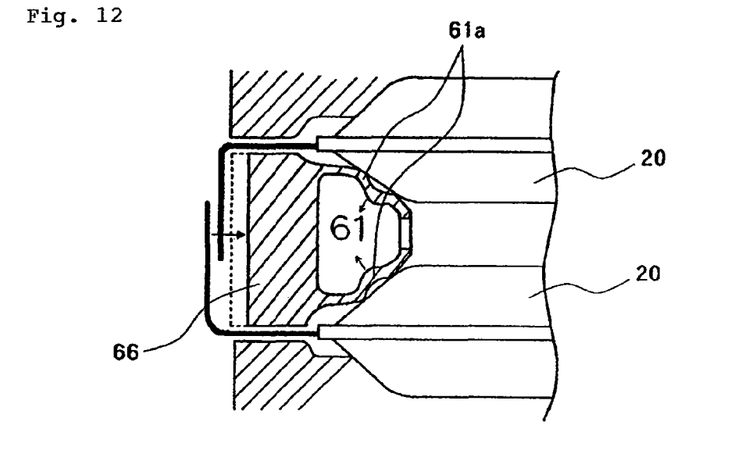
FIG. 12 is a view for illustrating absorption of an external force by deformation of a thin-walled portion.

Thin wall portion 61a, in addition to forming hollow portion 61, has a function of absorbing relatively small external force. That is, when the solid portion in area A of pressure contact member 60 is displaced toward battery cell 20 side (in the X-direction), thin wall portion 61a deforms folding up into hollow portion 61 as shown in FIG. 12 so as to a prevent relatively small external force from transferring to battery cell 20.

Next, other effects obtained by providing pressure contact members 60 in layers will be described.

The layered arrangement of pressure contact members 60 having a sufficient thickness relative to the thickness of electrode tab 25 enables the absorption of strong impacts in the vertical direction. The layered structure of pressure contacts members 60 facilities significant deformation of the contact members in response to input in the vertical direction which makes it possible to absorb impacts.

Further, in the exemplary embodiment, pressure contact members 60 having different weights and sizes may be used in combination. This makes it possible to prevent the battery modules from vibrating due to the vibration of the vehicle in which they are mounted.

Also, pressure contact members 60 that have different hardnesses may be used in combination. For example, when modules 50 are mounted, pressure contact members 60 located in the lower layers may have a hardness greater than that of pressure contact members 60 located in the upper layers. This makes it possible to prevent pressure contact members 60 located in the lower layers from being excessively compressed by their stacking. Alternatively, among layered pressure contact members 60 pressure contact members 60 located at both extremes with respect to the layered direction may be provided such that their hardness is different from that of pressure contact members 60 located in the inner part.

[Module Case]

Figure 13:
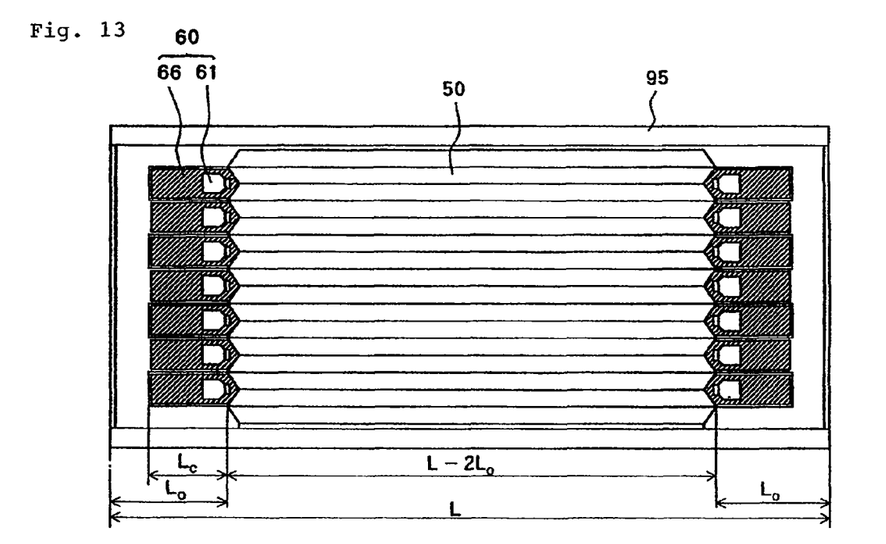
FIG. 13 is a sectional side view of a module case in which modules of the present invention are accommodated.

FIG. 13 shows a sectional side view showing a module case in which the modules of the exemplary embodiment are accommodated.

Modules 50 having a length of $(L-2L_0)$ are accommodated in a module case having outer dimension L. Pressure contact member 60 having length $L_c$ is attached at both sides of module 50. Here, length $L_c$ of pressure contact member 60 is an elastic member deformable area while length $L_0$ is a deformable area including both the deformable area of the elastic member and the deformable area of the module case. Length $L_c$ of pressure contact member 60 is an elastic member deformable area.

In order to avoid damage to the cell body even if it deforms up to 15 percent of outer dimension L of the module case, it is preferable to set $L_c = L \times 10\%$ and $L \times 20\% \geq L_0 = L \times 12\%$ for the relationship with outer dimension L of the module case.

Though not detailed in the description heretofore, battery element 22 that constitutes the lithium ion secondary battery may be comprised of alternately layered positive and negative electrode plates and separated by separators, specifically the positive electrode plate being formed by applying a positive electrode active material such as lithium-manganese composite oxide, lithium cobalt oxide or the like on both sides of aluminum foil or the like, the negative electrode plate being formed by applying a carbon material to which lithium can be doped to and dedoped from on both sides of copper foil or the like. Other than a lithium ion secondary battery, battery element 22 may be a chemical battery of a different kind such as a nickel-hydrogen battery, nickel-cadmium battery, lithium metal primary or lithium metal secondary battery, lithium polymer battery and the like. Alternatively, not limited to the layered type of the exemplary embodiment, battery element 22 may be a winding type having a layered structure of positive side and negative side active electrodes arranged alternately, formed by winding strip-like positive side and negative side active electrodes laid over with separators, then compressing the resultant so as to be flat. Further examples of the electric device element that constitutes a film-covered electric device include capacitors such as electric double layer capacitors, capacitor elements represented by electrolyte capacitors and the like.

Packaging film 24 may be a laminate film, for example. As a laminate film, it is acceptable as long as it can seal the battery element air-tightly in a proper manner. As one specific example, a laminate film made of a thermally fusible resin layer to be the inter surface and an air impermeable layer such as that of a metal membrane or the like and a protective layer (e.g., nylon etc.) to be the outer surface, are laminated in the order mentioned. The film-package is not limited to one that is formed by two sheets of packaging film 24. For example, a sheet of packaging film may be folded back and thermally sealed on the three sides forming a package. Further, the extracted position of each electrode tab 25 is not particularly limited. Two electrode tabs for positive and negative electrodes may be extracted from one side of the sealed portions of the film-package.

The invention claimed is:

1. An electric device assembly comprising:
    two or more film-covered electric devices arranged in layers, each film-covered electric device having an electric device element that reserves and outputs electric energy accommodated in a film package and an electrode tab extracted from a sealed portion of said film package; and
    a plurality of pressure contact members sandwiching said electrode tab in each of said film-covered electric devices, said plurality of pressure contact members provided outside of said film-covered electric devices, said plurality of pressure contact members comprising elastic material and each of said pressure contact members extending beyond said sealed portion in the direction in which said electrode tab is drawn out,
    wherein each of said pressure contact members includes a solid portion having a solid structure and a hollow portion having an outer peripheral wall integrally formed with said solid portion, said solid portion extending beyond said sealed portion in the direction in which said electrode tab is extracted, and said wall of said hollow portion abutting said film-covered electric device, and
    wherein said wall comes into hermetic contact with a sloping outer surface of the film-covered electric device, the sloping outer surface extended from said sealed portion.

2. The electric device assembly according to claim 1, wherein two or more modules, each made up of two or more film-covered electric devices arranged in the layers, are arranged in a low, and
    said pressure contact member includes a cooling air passage for transferring cooling air fed from a side of a first of said two or more film-covered electric devices arranged in a row to an outlet arranged so as to feed the cooling air to a second of said two or more film-covered electric devices arranged in the row, the pressure contact member directing and supplying said cooling air toward a central part of the second of said two or more film-covered electric devices at an area of the second of said two or more film-covered electric devices.

3. The electric device assembly according to claim 1, wherein said pressure contact member has a pressing surface that presses the vicinity of said electrode tab, and the pressing surface is put in contact with only said sealed portion.

4. The electric device assembly according to claim 1, wherein said pressure contact member has a pressing surface that presses the vicinity of said electrode tab, and the pressing surface is put in contact with only said electrode tab.

5. The electric device assembly according to claim 1, wherein said pressure contact member has a pressing surface that presses the vicinity of said electrode tab, and the pressing surface is put in contact with both said electrode tab and said sealed portion.

6. The electric device assembly according to claim 1, wherein two or more modules, each made up of two or more film-covered electric devices arranged in a row, are arranged in layers, and said pressure contact member is arranged between said film-covered electric device of one of said modules and said film-covered electric device of the other of said modules.

7. The electric device assembly according to claim 2, wherein an airflow passage that passes by said central part of each of said film-covered electric devices is formed between said film-covered electric devices arranged adjacent to each other in a layer, and an entrance side of the airflow passage and an entrance side of the cooling air passage of said pressure contact member are made open being oriented in the same direction.

8. The electric device assembly according to claim 7, wherein said airflow passage is hermetically closed along both sides by said pressure contact members.

9. The electric device assembly according to claim 1, wherein said pressure contact member is an elastic member that applies repulsive force as a result of elastic deformation to the vicinity of said electrode tab via said pressing surface.

10. The electric device assembly according to claim 2, wherein said pressure contact member further includes a channel for circulating a cooling agent, separately from said cooling air passage.

11. The electric device assembly according to claim 1, wherein said solid portions of said pressure contact members are layered so as to form a first area where said electrode tab is held therebetween and a second area where said pressure contact members are put in direct contact with each other.

12. The electric device assembly according to claim 1, wherein a first friction coefficient between said pressure contact members is greater than a second friction coefficient between said pressure contact member and said electrode tab.

13. The electric device assembly according to claim 1, wherein said pressure contact members are not bonded to each other.

14. The electric device assembly according to claim 1, wherein said pressure contact members are different in weight from each other.

15. The electric device assembly according to claim 2, wherein said cooling air passage is formed of said hollow portion formed in a longitudinal direction of said pressure contact member and said outlet is a plurality of outlets in communication with the hollow portion, each of said plurality of outlets opens toward a central part of said second of said film-covered electric device.

16. An electric device assembly comprising:
    two or more film-covered electric devices arranged in a row, each film-covered electric device having an electric device element that reserves and outputs electric energy accommodated in a film package and an electrode tab extracted from a sealed portion of said film package; and
    a pressure contact member having a tubular member, said pressure contact member provided outside of said film-covered electric devices, said tubular member pressing a vicinity of said electrode tab in each of said two or more film-covered electric devices, said tubular member including a cooling air passage for transferring cooling air fed from a side of a first of said two or more film-covered electric devices to a side of a second of said two or more film-covered electric devices, the pressure contact member directing and supplying said cooling air toward a central part of the second of said two or more film-covered electric devices at an area of the second of said two or more film-covered electric devices, wherein said pressure contact member has a pressing surface that presses the vicinity of said electrode tabs, and the pressing surface is put in contact with at least one of said sealed portions and said electrode tabs, and wherein said pressure contact member includes a hollow portion having an outer peripheral wall, said wall coming into hermetic contact with a sloping outer surface of the film-covered electric device, the sloping outer surface extended from said sealed portion.

17. The electric device assembly according to claim 16, wherein one end of said pressure contact member is open and another end of said pressure contact member is closed.

18. The electric device assembly according to claim 16, wherein two or more modules, each made up of two or more film-covered electric devices arranged in a row, are arranged in layers, and said pressure contact member is arranged between said film-covered electric device of one of said modules and said film-covered electric device of the other of said modules.

* * * * *